United States Patent
Greene

(10) Patent No.: US 9,580,186 B1
(45) Date of Patent: Feb. 28, 2017

(54) HELICOPTER TACTILE STALL WARNING

(71) Applicant: Safe Flight Instrument Corporation, White Plains, NY (US)

(72) Inventor: Randall A. Greene, White Plains, NY (US)

(73) Assignee: SAFE FLIGHT INSTRUMENT CORPORATION, White Plains, NY (US)

( * ) Notice: Subject to any disclaimer, the term of this patent is extended or adjusted under 35 U.S.C. 154(b) by 0 days.

(21) Appl. No.: 15/005,998

(22) Filed: Jan. 25, 2016

Related U.S. Application Data

(63) Continuation of application No. 14/839,704, filed on Aug. 28, 2015.

(51) Int. Cl.
  *B64D 43/02* (2006.01)
(52) U.S. Cl.
  CPC ................... *B64D 43/02* (2013.01)

(58) Field of Classification Search
  CPC .................................................. B64D 43/02
  See application file for complete search history.

(56) References Cited

U.S. PATENT DOCUMENTS

| | | | |
|---|---|---|---|
| 7,262,712 B2 | 8/2007 | Greene | |
| 2004/0010354 A1* | 1/2004 | Nicholas | B64C 13/503 701/4 |
| 2007/0065289 A1 | 3/2007 | Greene | |

* cited by examiner

*Primary Examiner* — Basil T Jos
(74) *Attorney, Agent, or Firm* — Morrison & Foerster LLP

(57) ABSTRACT

A helicopter stall warning method includes receiving an airspeed of the helicopter, determining a stall airspeed based on multiple factors associated with the helicopter, the multiple factors comprising ambient temperature near the helicopter, the helicopter's altitude, and the helicopter's gross weight, determining a stall warning threshold derived from the stall airspeed, and providing a tactile warning through a collective helicopter control when the helicopter's airspeed meets or exceeds the stall warning threshold.

15 Claims, 2 Drawing Sheets

HELICOPTER TACTILE STALL WARNING

CROSS REFERENCE TO RELATED APPLICATIONS

This application is a continuation of U.S. patent application Ser. No. 14/839,704 filed Aug. 28, 2015. The content of this application is incorporated herein by reference in its entirety.

FIELD OF THE DISCLOSURE

This disclosure generally relates to systems and methods for safely flying a helicopter. More particularly, this disclosure relates to systems and methods for providing a tactile warning when a helicopter's airspeed approaches a stall airspeed.

BACKGROUND

A helicopter can stall if its airspeed is too high. This is referred to as a retreating blade stall. In forward flight, a helicopter's retreating blade (the blade moving in the opposite direction as the aircraft) has a lower airspeed than its advancing blade. A retreating blade stall occurs when the retreating blade exceeds its critical angle of attack. As the helicopter's airspeed increases, the retreating blade's airspeed decreases and angle of attack increases. A stall occurs when the helicopter's airspeed exceeds an upper limit corresponding to the retreating blade's critical angle of attack.

The upper limit of helicopter airspeed is influenced by a number of factors. Some of these factors are outside of a pilot's control. For example, a change in ambient temperature near the aircraft can change the airspeed upper limit. In some cases, a pilot may maintain the same flight path and speed, but a stall may occur because of such external factors. Such a stall can be disorienting for a pilot, not just because of the loss of control of the helicopter, but also because the stall occurs without a warning to the pilot.

Stall warnings are available for fixed-wing aircraft, but not for helicopters. Fixed wing pilots and helicopter pilots can calculate a stall speed, but fixed wing pilots have an advantage because their calculations (and memory of their calculations) are supplemented by active warning systems in the aircraft. This may explain why helicopters' safety record is inferior to fixed wing aircraft's record.

SUMMARY

This disclosure relates to systems and methods for providing a tactile warning on a helicopter's collective control when the helicopter's airspeed approaches stall airspeed. Advantageously, the systems and methods may reduce helicopter accidents by quickly providing feedback to helicopter pilots of an imminent stall and focusing the pilot on the appropriate helicopter control input to avoid stall.

In one embodiment, a helicopter stall warning method includes receiving an airspeed of the helicopter, determining a stall airspeed based on multiple factors associated with the helicopter, the multiple factors comprising ambient temperature near the helicopter, the helicopter's altitude, and the helicopter's gross weight, determining a stall warning threshold derived from the stall airspeed, and providing a tactile warning through a collective helicopter control when the helicopter's airspeed meets or exceeds the stall warning threshold.

By focusing the pilot's attention on the collective control, the pilot can immediately reduce the airspeed of the helicopter to immediately reduce the angle of attack of the blades, thereby addressing the stall. In this way, the method may advantageously expedite the pilot's corrective actions.

In some embodiments, determining a stall airspeed includes referencing a database of stall airspeeds that correspond to at least one of the helicopters' altitude, the ambient temperature near the helicopter, and the helicopter's gross weight.

In some embodiments, the tactile warning is provided when the helicopter's airspeed is within a defined percentage of the stall airspeed. In some embodiments, the tactile warning is provided when the helicopter's airspeed is within a defined airspeed of the stall airspeed.

In some embodiments, the method includes receiving the helicopter's rotor revolutions per unit time and providing a tactile warning through the collective helicopter control when the helicopter's rotor speed meets or drops below a low rotor revolution per unit time threshold.

In one embodiment, a helicopter stall warning system includes a stall airspeed module that determines a stall airspeed of a helicopter based on the ambient temperature near the helicopter, the helicopter's altitude, and the helicopter's gross weight, a stall warning threshold module that receives the stall airspeed and determines a stall warning threshold from the stall airspeed, and a tactile warning module that receives the stall warning threshold and the helicopter's airspeed, and provides an activation signal to a shaker of the helicopter's collective control when the helicopter's airspeed meets or exceeds the stall warning threshold.

By focusing the pilot's attention on the collective control, the pilot can immediately reduce the airspeed of the helicopter to immediately reduce the angle of attack of the blades, thereby addressing the stall. In this way, the system may advantageously expedite the pilot's corrective actions.

In some embodiments, the system further includes a database of stall airspeeds that correspond to at least one of the helicopters' altitude, the ambient temperature near the helicopter, and the helicopter's gross weight, wherein the stall airspeed module determines the stall airspeed by accessing the database.

In some embodiments, the helicopter's airspeed meets or exceeds the stall warning threshold when the helicopter's airspeed is within a defined percentage of the stall airspeed. In some embodiments, the helicopter's airspeed meets or exceeds the stall warning threshold when the helicopter's airspeed is within a defined airspeed of the stall airspeed.

In some embodiments, the tactile warning module receives the helicopter's rotor revolution per unit time, and provides the activation signal to the shaker of the helicopter's collective control when the helicopter's rotor revolution per unit time meets or drops below a rotor revolution per unit time warning threshold.

DETAILED DESCRIPTION

In the following description of embodiments, reference is made to the accompanying drawings which form a part hereof, and in which it is shown by way of illustration specific embodiments in which the claimed subject matter may be practiced. It is to be understood that other embodiments may be utilized and structural changes may be made without departing from the scope of the claimed subject matter.

This disclosure relates to systems and methods for providing a tactile warning on a helicopter's collective control when the helicopter's airspeed approaches stall airspeed. Advantageously, the systems and methods may reduce helicopter accidents by quickly providing feedback to helicopter pilots of an imminent stall and focusing the pilot onto the appropriate helicopter control input to avoid stall.

Figure 1:
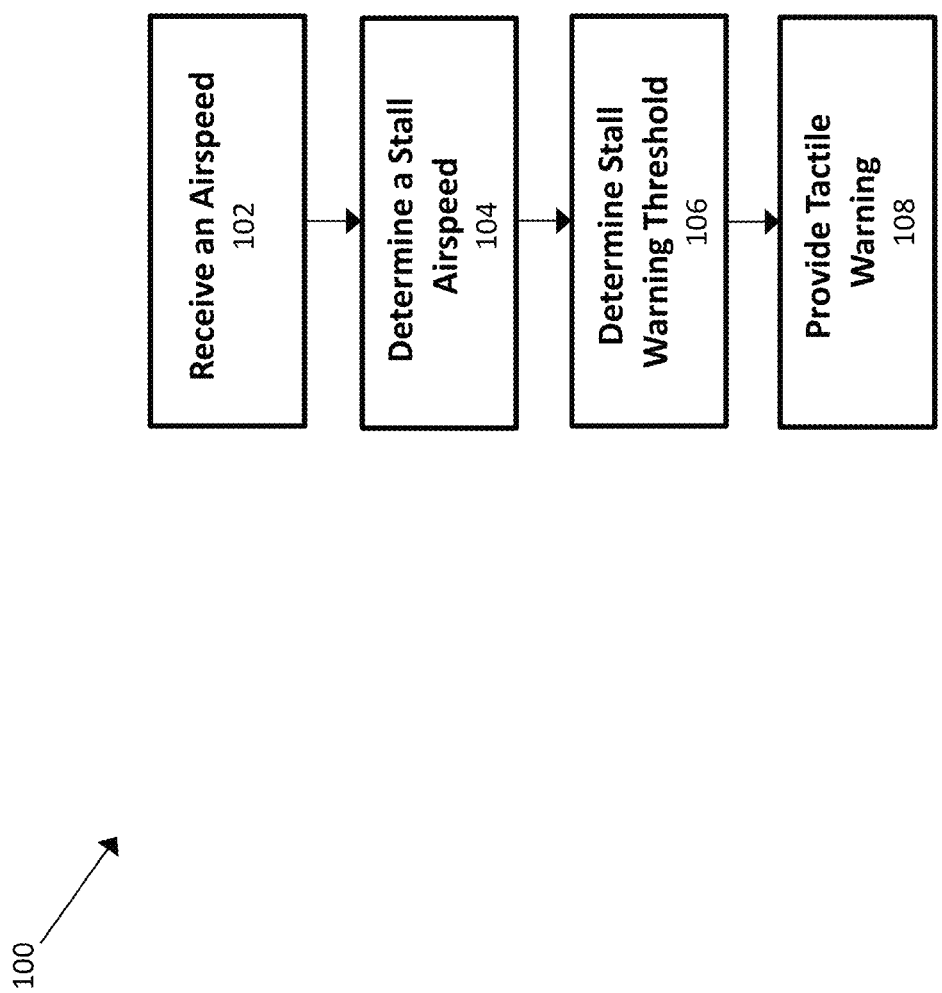
FIG. 1 depicts a helicopter stall warning method, in accordance with an embodiment.

FIG. 1 depicts a helicopter stall warning method, in accordance with an embodiment. Method 100 includes receiving an airspeed of the helicopter 102, determining a stall airspeed based on multiple factors associated with the helicopter 104, determining a stall warning threshold derived from the stall airspeed 106, and providing a tactile warning through a collective helicopter control when the helicopter's airspeed meets or exceeds the stall warning threshold 108. The multiple factors include ambient temperature near the helicopter, the helicopter's altitude, and the helicopter's gross weight.

Systems and methods for providing a tactile warning on a control stick are disclosed in U.S. Pat. No. 7,262,712, the disclosure of which is incorporated herein by reference in its entirety.

In some embodiments, the helicopter's gross weight is inputted by the pilot (e.g., by selecting a "high gross weight" or a "low gross weight"). In some embodiments, the helicopter's gross weight is provided by a Flight Management System.

In some embodiments, determining a stall airspeed includes referencing a database of stall airspeeds that correspond to at least one of the helicopters' altitude, the ambient temperature near the helicopter, and the helicopter's gross weight.

In some embodiments, the tactile warning is provided when the helicopter's airspeed is within a defined percentage of the stall airspeed. In some embodiments, the tactile warning is provided when the helicopter's airspeed is within a defined airspeed of the stall airspeed.

In some embodiments, the method includes receiving the helicopter's rotor revolutions per unit time and providing a tactile warning through the collective helicopter control when the helicopter's rotor speed meets or drops below a low rotor revolution per unit time threshold.

Figure 2:
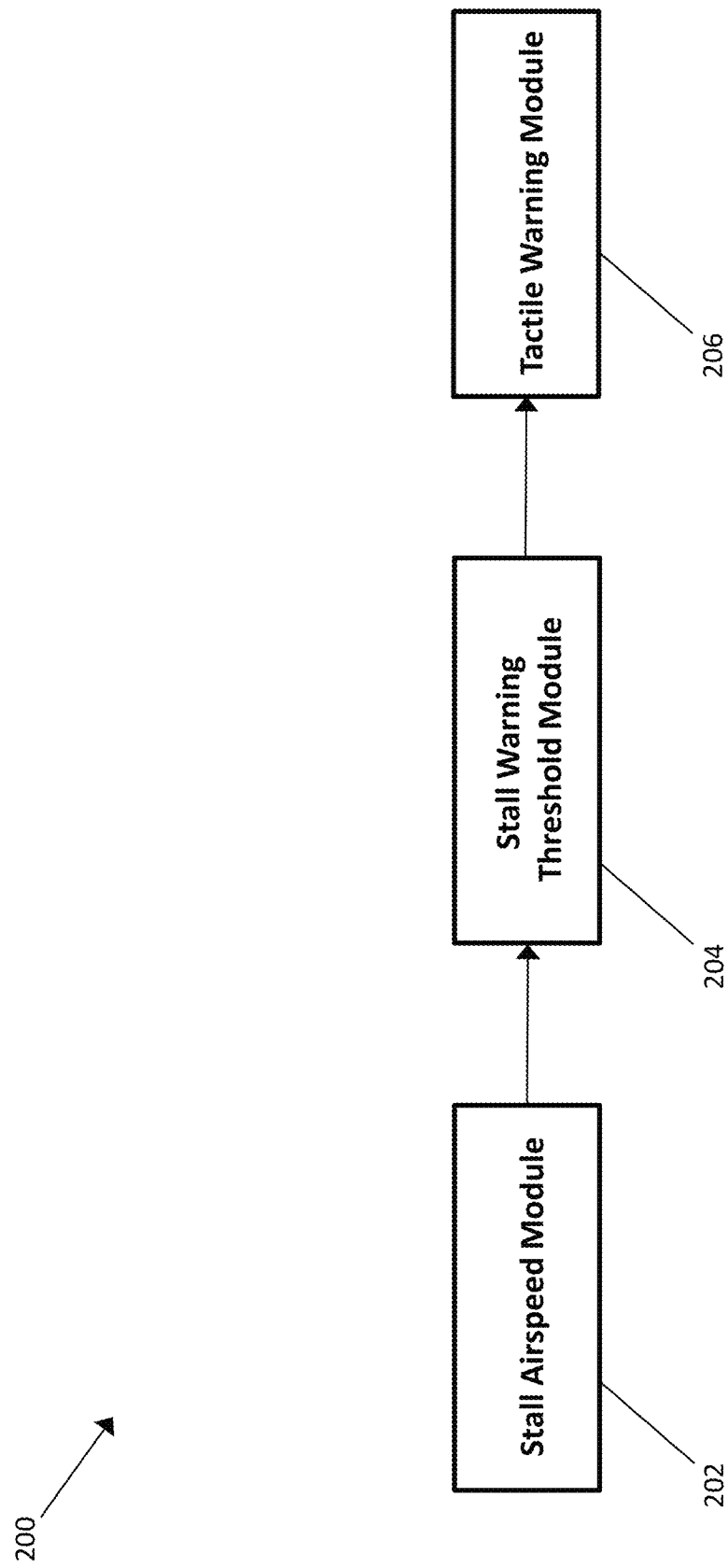
FIG. 2 depicts a helicopter stall warning system, in accordance with an embodiment.

FIG. 2 depicts a helicopter stall warning system 200, in accordance with an embodiment. System 200 includes a stall airspeed module 202, a stall warning threshold module 204, and a tactile warning module 206. The stall airspeed module determines a stall airspeed of the helicopter based on the ambient temperature near the helicopter, the helicopter's altitude, and the helicopter's gross weight. The stall warning threshold module receives the stall airspeed and determines a stall warning threshold from the stall airspeed. The tactile warning module receives the stall warning threshold and the helicopter's airspeed, and provides an activation signal to a shaker of the helicopter's collective control when the helicopter's airspeed meets or exceeds the stall warning threshold.

In some embodiments, the helicopter's gross weight is inputted by the pilot (e.g., by selecting a "high gross weight" or a "low gross weight"). In some embodiments, the helicopter's gross weight is provided by a Flight Management System.

In some embodiments, the system further includes a database of stall airspeeds that correspond to at least one of the helicopters' altitude, the ambient temperature near the helicopter, and the helicopter's gross weight, wherein the stall airspeed module determines the stall airspeed by accessing the database.

In some embodiments, a tactile warning is provided when the helicopter's airspeed is within a defined percentage of the stall airspeed. In some embodiments, a tactile warning is provided when the helicopter's airspeed is within a defined airspeed of the stall airspeed.

In some embodiments, the tactile warning module receives the helicopter's rotor revolution per unit time, and provides the activation signal to the shaker of the helicopter's collective control when the helicopter's rotor revolution per unit time meets or drops below a rotor revolution per unit time warning threshold.

The term "module" as used herein, refers to software, firmware, hardware, and any combination of these elements. Additionally, for purpose of discussion, the various modules are described as discrete modules; however, as would be apparent to one of ordinary skill in the art, two or more modules may be combined to form a single module that performs the associated functions.

One skilled in the relevant art will recognize that many possible modifications and combinations of the disclosed embodiments can be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations can be possible in view of the above teachings. The embodiments were chosen and described to explain the principles of the disclosure and their practical applications, and to enable others skilled in the art to best utilize the disclosure and various embodiments with various modifications as suited to the particular use contemplated.

Further, while this specification contains many specifics, these should not be construed as limitations on the scope of what is being claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A helicopter stall warning method comprising:
   receiving an airspeed of the helicopter,
   determining a stall airspeed based on multiple factors associated with the helicopter, the multiple factors comprising ambient temperature near the helicopter, the helicopter's altitude, and the helicopter's gross weight,
   determining a stall warning threshold derived from the stall airspeed, and providing a tactile warning through a collective helicopter control when the helicopter's airspeed meets or exceeds the stall warning threshold.

2. The method of claim 1, wherein determining a stall airspeed comprises referencing a database of stall airspeeds that correspond to at least one of the helicopters' altitude, the ambient temperature near the helicopter, and the helicopter's gross weight.

3. The method of claim 1, comprising providing a tactile warning when the helicopter's airspeed is within a defined percentage of the stall airspeed.

4. The method of claim 1, comprising providing a tactile warning when the helicopter's airspeed is within a defined airspeed of the stall airspeed.

5. The method of claim 1, comprising receiving the helicopter's rotor revolutions per unit time and providing a tactile warning through the collective helicopter control when the helicopter's rotor speed meets or drops below a low rotor revolution per unit time threshold.

6. A helicopter stall warning system comprising:
- a stall airspeed processor configured to determine a stall airspeed of a helicopter based on the ambient temperature near the helicopter, the helicopter's altitude, and the helicopter's gross weight,
- a stall warning threshold processor configured to receive the stall airspeed and determines a stall warning threshold from the stall airspeed, and
- a tactile warning processor configured to receive the stall warning threshold and the helicopter's airspeed, and provide an activation signal to a shaker of the helicopter's collective control when the helicopter's airspeed meets or exceeds the stall warning threshold.

7. The system of claim 6, further comprising a database of stall airspeeds that correspond to at least one of the helicopters' altitude, the ambient temperature near the helicopter, and the helicopter's gross weight, wherein the stall airspeed processor is configured to determine the stall airspeed by accessing the database.

8. The system of claim 6, wherein a tactile warning is provided when the helicopter's airspeed is within a defined percentage of the stall airspeed.

9. The system of claim 6, wherein a tactile warning is provided when the helicopter's airspeed is within a defined airspeed of the stall airspeed.

10. The system of claim 6, wherein the tactile warning processor is configured to receive the helicopter's rotor revolution per unit time, and provide the activation signal to the shaker of the helicopter's collective control when the helicopter's rotor revolution per unit time meets or drops below a rotor revolution per unit time warning threshold.

11. A helicopter stall warning system comprising a non-transitory computer readable storage medium storing one or more programs, the one or more programs comprising instructions, which when executed by one or more processors of an electronic device, cause the device to:
- receive an airspeed of the helicopter,
- determine a stall airspeed based on multiple factors associated with the helicopter, the multiple factors comprising ambient temperature near the helicopter, the helicopter's altitude, and the helicopter's gross weight,
- determine a stall warning threshold derived from the stall airspeed, and
- provide a tactile warning through a collective helicopter control when the helicopter's airspeed meets or exceeds the stall warning threshold.

12. The computer readable medium of claim 11, wherein determining a stall airspeed comprises referencing a database of stall airspeeds that correspond to at least one of the helicopters' altitude, the ambient temperature near the helicopter, and the helicopter's gross weight.

13. The computer readable medium of claim 11, wherein the one or more programs further comprising instructions to provide a tactile warning when the helicopter's airspeed is within a defined percentage of the stall airspeed.

14. The computer readable medium of claim 11, wherein the one or more programs further comprise instructions to provide a tactile warning when the helicopter's airspeed is within a defined airspeed of the stall airspeed.

15. The computer readable medium of claim 11, wherein the one or more programs further comprise instructions to receive the helicopter's rotor revolutions per unit time and provide a tactile warning through the collective helicopter control when the helicopter's rotor speed meets or drops below a low rotor revolution per unit time threshold.

* * * * *